United States Patent
Haitko et al.

[11] Patent Number: 5,754,002
[45] Date of Patent: May 19, 1998

[54] ANTIOXIDANT CONTROL OF LEACHABLE MERCURY IN FLUORESCENT LAMPS

[75] Inventors: Deborah Ann Haitko, Schenectady; Donald Franklin Foust, Scotia; David Key Dietrich, Schenectady, all of N.Y.

[73] Assignee: General Electric Company, Schenectady, N.Y.

[21] Appl. No.: 744,136

[22] Filed: Nov. 5, 1996

[51] Int. Cl.⁶ .................................................. H01J 61/00
[52] U.S. Cl. ................... 313/565; 313/318.01; 313/485; 313/490; 455/2; 455/61; 455/73
[58] Field of Search ............................. 313/565, 318.01, 313/318.02, 485, 490, 493, 546, 642, 639; 445/2, 61, 73

[56] References Cited

U.S. PATENT DOCUMENTS

| | | | |
|---|---|---|---|
| 4,354,942 | 10/1982 | Kaczur et al. | 210/712 |
| 5,229,686 | 7/1993 | Fowler et al. | 313/565 |
| 5,229,687 | 7/1993 | Fowler et al. | 313/565 |

*Primary Examiner*—Nimeshkumar Patel
*Attorney, Agent, or Firm*—James Magee, Jr.; Douglas E. Stoner

[57] ABSTRACT

The formation of leachable mercury upon disposal or during TCLP testing of mercury vapor discharge lamps is substantially prevented by incorporation of an antioxidant in the lamp structure or in the test solution.

7 Claims, 2 Drawing Sheets

ANTIOXIDANT CONTROL OF LEACHABLE MERCURY IN FLUORESCENT LAMPS

This invention is directed to mercury vapor arc discharge lamps in which the arc discharge takes place in mercury vapor, including conventional phosphor fluorescent lamps and more particularly to avoidance of mercury pollution of landfills and groundwaters upon disposal of such lamps and during testing for leaching of toxic materials from such lamps and to compositions of matter useful in preventing the formation of leachable mercury in disposal and testing procedures. The lamps provided herein are characterized by reduced solubilization and leaching of mercury when the lamp is pulverized for testing or upon disposal.

BACKGROUND OF THE INVENTION

Low pressure mercury arc discharge lamps are standard lighting means which include electrodes sealed in a glass envelope, the interior of which may be coated with a phosphor. The lamp also contains a small amount of mercury and an inert gas at low pressure, of about 1 to 5 torr. The term lamp, as used herein, means the complete unit including the glass envelope and the end pieces and plugs for mounting in a lamp fixture, and wires which connect the internal components of the envelope with the end pieces.

During manufacture of fluorescent or low pressure mercury arc lamps an amount of elemental mercury ($Hg^o$) is sealed in the lamp envelope. Most of the mercury adheres to the phosphor coating, a small amount being in the vapor phase.

During operation, alkali metal carbonates from the electrodes decompose and form free oxygen in the lamp. The oxygen may react with a portion of the mercury to form soluble mercury oxide ($Hg^o$). Soluble mercury oxide is leachable from land fills and other disposal facilities. Soluble mercury oxides or other oxidized forms of mercury formed in the course of the test are detrimental to the accuracy and reliability of the standard test for determination of the leachability of toxic materials from lamp waste. This test is generally referred to as the Toxicity Leaching Characteristic Procedure or TLCP test.

There is concern about the environmental impact of soluble mercury compounds which can leach into ground water sources, rivers, streams, and the like.

SUMMARY OF THE INVENTION

Ferric and cuprous ions form soluble compounds which are capable of oxidizing elemental mercury to the monovalent, mercurous, form which is soluble in an acidic aqueous environment and therefore leachable. The formation of ferric and cuprous compounds depend on exposure to and reaction with oxygen. Antioxidants, either organic or inorganic, incorporated in the lamp prevent formation of ferric and cuprous compounds, in the presence of water or moisture, by oxidation of iron and copper from lamp components, thereby greatly reducing or preventing the formation of leachable mercurous and mercuric compounds by oxidation of elemental mercury.

The invention provides a mercury vapor discharge lamp comprising an envelope of light transmitting glass which contains, an inert gas and an amount of elemental mercury, a pair of electrodes for establishing an arc discharge, and an effective amount of an antioxidant.

The lamp further comprises at least one base or end cap which defines a cavity having an inner surface, and which is secured to the lamp envelope by a basing cement, the antioxidant being disposed within said cavity. Generally such lamps have a pair of end caps.

The antioxidant is admixed with the basing cement securing the end caps in place on the glass envelope.

The invention further provides a composition which can be included in the lamp structure for the purpose of controlling oxidation of iron and copper in order to minimize or prevent formation of soluble mercury compounds, thereby reducing or preventing formation of water soluble leachable mercury compounds in landfills or TLCP test samples.

In a preferred embodiment of the invention, the mercury vapor discharge lamp is provided with an antioxidant carried on the inner surface of the cavity by means of an inert water soluble adhesive binder.

DESCRIPTION OF THE INVENTION

Figure 1:
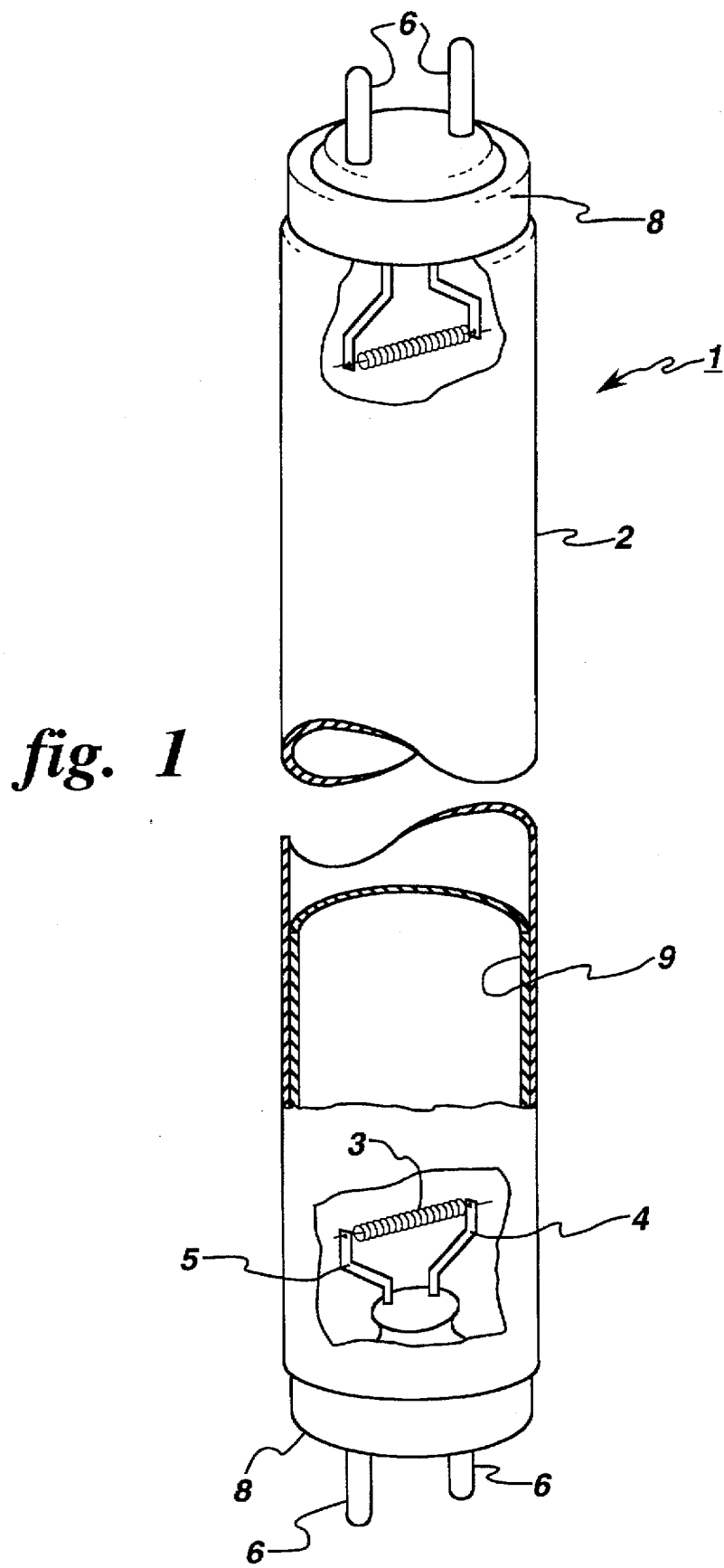
FIG. 1 is a partially broken away section of a low pressure mercury fluorescent lamp 1 comprising a glass envelope 2 having a phosphor coating 9 on the inner surface of the glass. Connector pins 6 are in electrical contact with leads 4 and 5 and also with electrodes 3.
Figure 2:
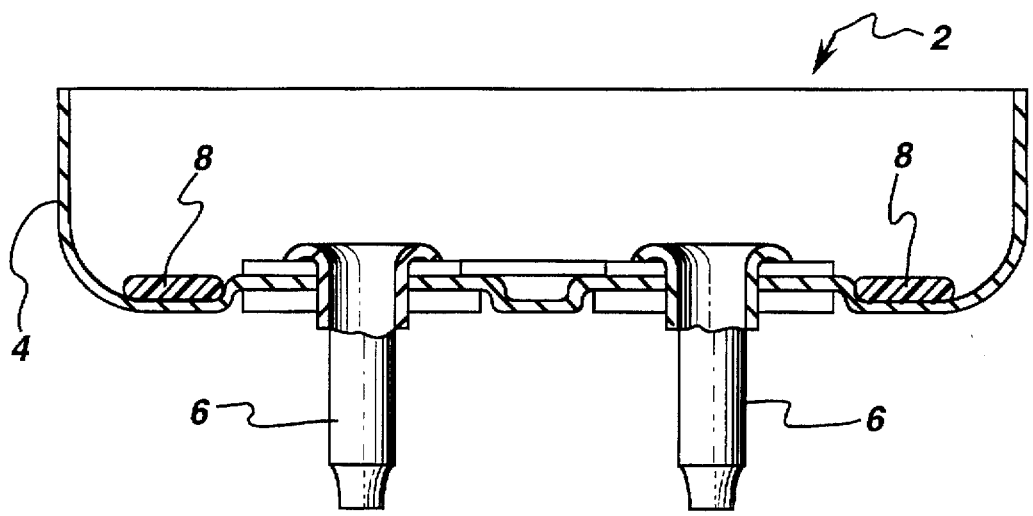
In FIGS. 2 and 3 the end caps are shown as 2, corresponding to numeral 8 of FIG. 1. The end cap is provided with connector pins 6 and pH control agent 8 deposited in the cavity of end cap 2.
Figure 3:
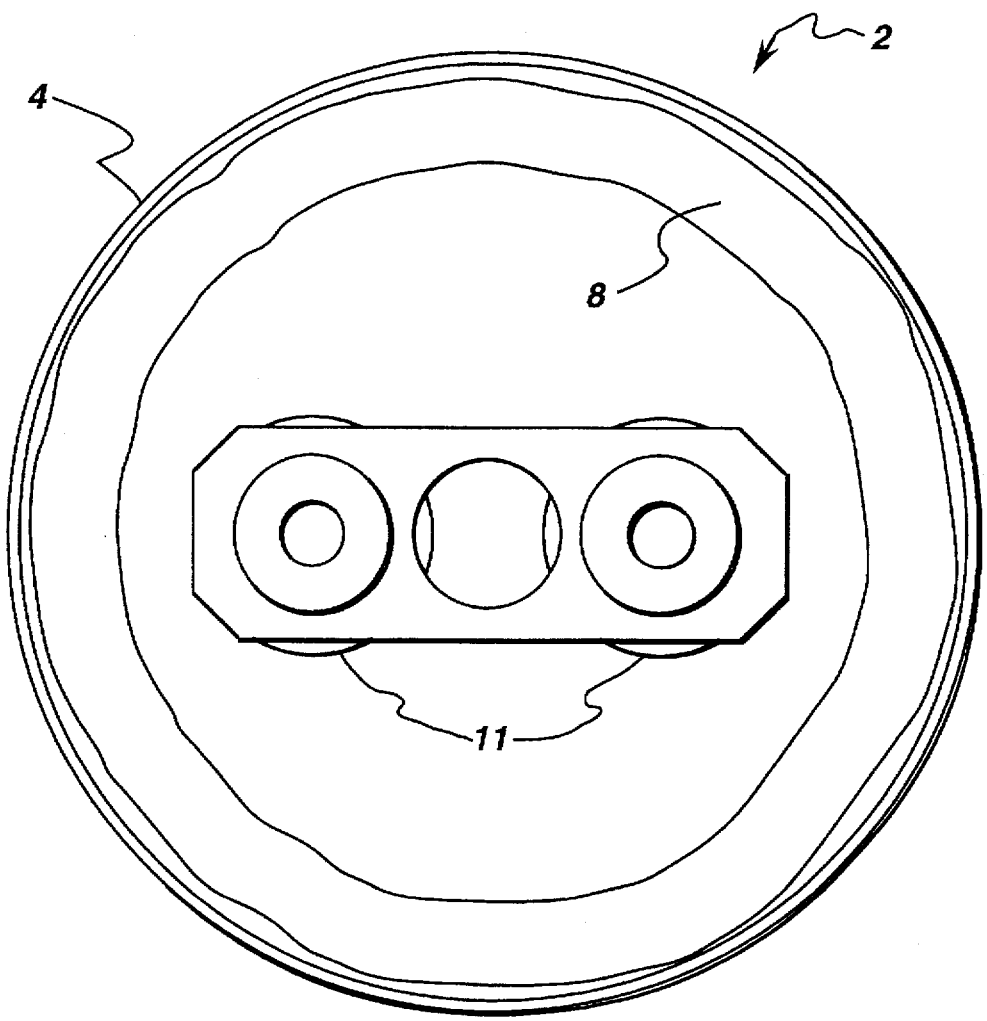

The incorporation of antioxidants in a lamp structure or to the TLCP test solution prevents oxidation of iron and copper metal components to a form which is both soluble and capable of oxidizing elemental mercury to a soluble form of mercury oxide. Accordingly the formation and dissolution of soluble ferric and cuprous compounds from the lamp components is diminished or prevented resulting in reduction or prevention of leachable mercury compounds.

The formation of leachable mercury when fluorescent lamps are broken and exposed to landfill conditions can be prevented or minimized by preventing oxidation of certain components of the lamp. Certain metal components of fluorescent lamps particularly iron lead wires, copper coated leads, and any brass components generate ferric ($Fe^{+3}$) and cuprous ($Cu^{+1}$) ions when exposed to moisture, oxygen, and acidity.

In order to address the growing concern that excessive amounts of mercury from disposal of fluorescent lamps might leach into surface and subsurface bodies of water, the Environmental Protection Agency has established a maximum concentration level for mercury at 0.2 milligrams of leachable mercury per liter. This is generally determined by the standard analysis known as the Toxicity Characteristic Leaching Procedure (TCLP), a well known test procedure.

In carrying of the TCLP test, the lamps are pulverized to form lamp waste material similar to that which would result from lamp disposal in land fills or other disposal locations. The ambient conditions in such locations may be such as to promote formation of leachable mercury just as the TCLP test conditions themselves tend to allow for formation of leachable mercury in amounts greater than the established limit of 0.2 milligrams per liter.

It has been found that elemental mercury added to mercury-free pulverized lamp materials prepared for the TCLP test is converted to leachable mercury in the course of the test. If elemental mercury alone or in combination with various glass, phosphor, or non-metal lamp components is tested, little or essentially no leachable mercury is found. When elemental mercury is tested in combination with metal lamp components such as copper or iron, lead wires, pins, or other metal hardware, the mercury is transformed into a leachable form.

It was determined by controlled experimentation that both ferric iron (trivalent) and cuprous (monovalent) copper are generated under the TCLP test conditions when carried out in the presence of oxygen and that these ionic species are able to oxidized elemental mercury to soluble mercury compounds which are measured as leachable mercury.

Corrosion or dissolution of metals from the metallic state requires the presence of both oxygen and a solvent such as water conditions that exist in the TCLP test and landfill situations. Accordingly, it has been found that the formation can be controlled or prevented by controlling or excluding exposure to oxygen of the iron and copper-containing metal lamp components. This can be done by the use of oxygen-free or anaerobic test and disposal conditions.

Organic or inorganic antioxidants incorporated into fluorescent lamps during manufacture become operative in the course of preparing lamps for the TCLP test or upon destruction of the lamp during disposal. The presence of such antioxidants will make the TCLP test more accurate and reliable and will reduce the formation of soluble mercury compounds when the lamps are disposed of.

Suitable antioxidants include any materials, compounds, or systems which prevent or reduce the formation of ferric and cuprous ions in the mercury-containing environment. Illustrative organic and inorganic antioxidants (reducing agents) include ascorbic acid, sodium ascorbate, calcium ascorbate, ferrous sulfate, ferrous oxide, ferrous tatrate, ferrous citrate, ferrous gluconate, ferrous chloride, and the like. Ascorbic acid is a preferred antioxidant for use in this invention.

The principles and practice of this invention will be more fully understood when considered in view of the following examples.

All TCLP test data was obtained by the test procedure prescribed on pages 26987–26998 volume 55, number 126 of the Jun. 29, 1990 issue of the Federal Register.

Briefly, lamps being tested are pulverized into particulate form having the prescribed particle size which is capable of passing through ⅜ inch sieve. The test material is then extracted with a sodium acetate-acetic acid buffer at a pH of about 4.93.

To prevent the spurious formation of leachable mercury upon disposal of mercury vapor discharge lamps and to improve the reliability of the TCLP test an effective amount of an antioxidant is incorporated in the lamp structure, for example within the glass envelope exterior to the plasma discharge or in an end-cap, or in the base of the lamp. An effective amount of the antioxidant is that amount which will substantially prevent formation of ferric and cuprous compounds which can oxidize elemental mercury to a soluble form. In general, an effective amount of the antioxidant will be enough for the TCLP test results to show the presence of less than about 0.2 parts per million of leachable mercury.

The formation of soluble mercury compounds is illustrated by the data in Table 1, below. Carrying out the TCLP test in the presence of air generates about 1 part per million of copper and about 0.3 parts per million of soluble iron. The amount of soluble mercury formed under these conditions exceeds the regulatory limit of 0.2 parts per million. Increasing the exposure to oxygen increases the amount of soluble copper and soluble mercury formed. Decreasing exposure to oxygen decreases the formation of soluble copper, soluble iron, and soluble mercury.

TABLE 1

| Gas Type | Soluble Cu ppm | Soluble Hg ppm |
|---|---|---|
| Air | 1.07 | 0.777 |
| Argon | 0.06 | <0.050 |
| Oxygen | 3.04 | 1.030 |

When the amount of oxygen is varied by increasing the volume of the head space in the TCLP test jar, the effect of both soluble iron and copper on the formation of soluble mercury is evident from the data in Table 2, below. As the head space volume increases, the amount of soluble mercury increases in response to the formation of increasing amounts of soluble copper and iron.

TABLE 2

| Head Space (mL) | Soluble Mercury (ppb) | Soluble Iron (ppm) | Soluble Copper (ppm) |
|---|---|---|---|
| 0 | 0.0000 | 210 | 3.62 | 0.35 |
| 1 | 140 | 214 | 4.63 | 0.40 |
| 2 | 205 | 203 | 5.04 | 0.63 |
| 3 | 360 | 250 | 5.22 | 0.43 |
| 4 | 494 | 311 | 5.22 | 0.51 |
| 5 | 763 | 525 | 6.13 | 1.04 |
| 6 | 1013 | 458 | 5.80 | 1.02 |
| 7 | 1508 | 583 | 8.12 | 1.13 |

When an antioxidant such as ascorbic acid is added to the test solution, the formation of soluble mercury is decreased as shown in Table 3, below.

TABLE 3

| Additive | Hg Dose (mg/lamp) | Amount of Additive (gms/lamp) | ORP* | Final pH | Leachable Hg (ppb) |
|---|---|---|---|---|---|
| none | 21.2 | — | — | — | 745 |
| ascorbic acid | 20.0 | 2 | 130 | 5.2 | <50 |
| ascorbic acid | 20.0 | 0.1 | | | 134 |
| ascorbic acid | 20.0 | 0.2 | | | 72 |
| ascorbic acid | 20.0 | 0.5 | | | 52 |
| ascorbic acid | 20.0 | 1 | | | 84 |
| sodium ascorbate | 20.0 | 1 | | | 32 |
| sodium ascorbate | 20.0 | 0.2 | | | 51 |
| sodium ascorbate | 20.0 | 0.5 | | | 46 |
| sodium ascorbate | 20.0 | 2 | | | 43 |
| calcium ascorbate | 20.0 | 0.2 | | | 56 |
| calcium ascorbate | 20.0 | 0.5 | | | 95 |
| calcium ascorbate | 20.0 | 1 | | | 76 |
| calcium ascorbate | 20.0 | 2 | | | 59 |
| none | 20.0 | 0 | | | 586 |
| Ferrous sulfate | 20.0 | 1 | | | 149 |
| Ferrous sulfate | 20.0 | 2 | | | 112 |

TABLE 3-continued

| Additive | Hg Dose (mg/lamp) | Amount of Additive (gms/lamp) | ORP* | Final pH | Leachable Hg (ppb) |
|---|---|---|---|---|---|
| Ferrous sulfate | 20.0 | 0.5 | | | 318 |
| Ferrous sulfate | 20.0 | 0.2 | | | 443 |
| Ferrous gluconate | 20.0 | 1 | | | 97 |
| Ferrous gluconate | 20.0 | 2 | | | 75 |
| Ferrous gluconate | 20.0 | 0.4 | | | 281 |

*ORP = Oxidation Reduction Potential

Table 3 shows examples of antioxidants that have been added to the TCLP extraction to study the effect upon leachable mercury. The first entry is a control showing the amount of leachable mercury generated when the pulverized lamp is dosed with 20 mg of elemental mercury. The leachable mercury generated in that case is 745 ppb in the absence of any antioxidant. The antioxidant can be incorporated in the lamp by encapsulation of the material in a glass capsule that can be placed either in the base of the lamp between the aluminum cap and flare of leaded glass, or placed within the positive column of the lamp. Since the antioxidant is enclosed in a glass capsule it could be present in the inside or positive column of the lamp without affecting lamp function.

The antioxidant material can also be incorporated in the basing cement of the lamp that holds the aluminum cap to the leaded glass portion of the end of the lamp. The basing cement generally comprises about 80 weight % marble flour (limestone-CaO), and the balance shellac a phenolic resin binder, a solvent for blending, and a dye used to color the cement. The cement is dispensed through a feeder into the base and heated to cure once assembled with the lamp. The curing drives off the solvent and solidifies the cement. The antioxidant is blended with the cement components and incorporated into a lamp manually or by automated manufacturing equipment. The antioxidant material is released only when the lamp is destroyed or crushed in preparation for TCLP testing. In this method the active antioxidant material is always exterior to the positive column of the lamp.

Another method for incorporating the active antioxidant material in the lamp structure is to admix it with an inert water soluble adhesive carrier or binder. Gums and gelatins have been used as such adhesives and binders. The nature of the gums and gelatins is that they adhere to surfaces when heated. The composition containing the antioxidant material can be placed on the inner surface of the aluminum end cap as a ring or discrete button. When the lamp is crushed and exposed to an aqueous environment or placed in the TCLP solution, the water soluble binder allows the antioxidant to be released quickly.

What is claimed is:

1. A mercury vapor discharge lamp comprising an envelope of light transmitting glass which contains, an inert gas and an amount of elemental mercury, a pair of electrodes for establishing an arc discharge, and an effective amount of an antioxidant.

2. The mercury vapor discharge lamp of claim 1 wherein the antioxidant is selected from the group consisting of ascorbic acid and sodium ascorbate.

3. The lamp according to claim 1 in which the antioxidant is ascorbic acid, sodium ascorbate, calcium ascorbate, ferrous sulfate, ferrous oxide, ferrous tatrate, ferrous citrate, ferrous gluconate, or ferrous chloride and is present in an amount of about 0.05 to about 10 grams per lamp.

4. The lamp according to claim 1 further comprising at least one base end cap which defines a cavity having an inner surface, and which is secured to the lamp envelope by a basing cement, the antioxidant being disposed within said cavity.

5. The lamp according to claim 4 in which the antioxidant is admixed with the basing cement.

6. The mercury vapor discharge lamp according to claim 5 wherein the antioxidant is carried on the inner surface of the cavity by means of an inert water soluble binder.

7. A method for preventing the formation of leachable mercury compounds in mercury vapor discharge lamps which comprises incorporation into the lamp structure of an effective amount of an antioxidant.

* * * * *